United States Patent
Chang et al.

(10) Patent No.: US 8,380,720 B2
(45) Date of Patent: Feb. 19, 2013

(54) METHOD FOR DATA ENCRYPTION AND METHOD FOR CONJUNCTIVE KEYWORD SEARCH OF ENCRYPTED DATA

(75) Inventors: Kuyoung Chang, Daejeon (KR); Namsu Jho, Seoul (KR); Dowon Hong, Daejeon (KR); Hyunsook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 421 days.

(21) Appl. No.: 12/614,923

(22) Filed: Nov. 9, 2009

(65) Prior Publication Data

US 2010/0153403 A1 Jun. 17, 2010

(30) Foreign Application Priority Data

Dec. 12, 2008 (KR) .................. 10-2008-0126702

(51) Int. Cl.
G06F 17/30 (2006.01)

(52) U.S. Cl. ........ 707/747; 380/277; 707/696; 713/150; 713/189

(58) Field of Classification Search .......................... None
See application file for complete search history.

(56) References Cited

U.S. PATENT DOCUMENTS

| 2001/0019614 | A1 | 9/2001 | Madoukh |
| 2006/0041533 | A1 | 2/2006 | Koyfman |
| 2006/0129545 | A1* | 6/2006 | Golle et al. .................. 707/4 |
| 2008/0310620 | A1* | 12/2008 | Kim et al. .................. 380/28 |

FOREIGN PATENT DOCUMENTS

KR  1020080035295  4/2008

OTHER PUBLICATIONS

Ballard et al., Achieving Efficient Conjunctive Keyword Searches over Encrypted Data, ICICS 2005, LNCS 3783, pp. 414-426.*
Golle, Philippe et al., "Secure Conjunctive Keyword Search over Encrypted Data," retrieved online at http://www.parc.com/publication/1361/secure-conjunctive-keyword-search-over-encrypted-data.html (2004).
Ryu, Eun-Kyung et al., "Efficient Conjunctive Keyword-Searchable Encryption," 21st International Conference on Advanced Information Networking and Application Workshops (AINAW'07) (2007).

* cited by examiner

*Primary Examiner* — Anteneh Girma
(74) *Attorney, Agent, or Firm* — Nelson Mullins Riley & Scarborough LLP; EuiHoon Lee, Esq.

(57) ABSTRACT

A server provides the user's desired data without the server knowing the contents or keywords of data by using a method of searching the desired data without decrypting the encrypted data, such that the privacy for the important data of the user can be secured. Also, the present invention shortens the operation time when searching the encrypted data, such that it can prevent the degradation in efficiency due to excess operation involved in the previous existing methods based on the pairing operation.

11 Claims, 6 Drawing Sheets

FIG. 6C

| "NAME: HONG GIL DONG" | "BIRTHDAY: 1960-01-01" | ... | 'ADDRESS: NULL' |
|---|---|---|---|

FIG. 7

| Data (A) | Index (B) |
|---|---|
| $E_{K_1}(D_1)$ | $h(a_1), a_1^{h11} \bmod_n, a_1^{h12} \bmod_n, \cdots, a_1^{hJ} \bmod_n$ |
| $E_{K_1}(D_2)$ | $h(a_2), a_2^{h21} \bmod_n, a_2^{h22} \bmod_n, \cdots, a_2^{h2J} \bmod_n$ |
| ⋮ | ⋮ |
| $E_{K_1}(D_I)$ | $h(a_I), a_I^{hI1} \bmod_n, a_I^{hI2} \bmod_n, \cdots, a_I^{hIJ} \bmod_n$ |

US 8,380,720 B2

METHOD FOR DATA ENCRYPTION AND METHOD FOR CONJUNCTIVE KEYWORD SEARCH OF ENCRYPTED DATA

RELATED APPLICATIONS

The present application claims priority to Korean Patent Application Serial Number 10-2008-0126702, filed on Dec. 12, 2008, the entirety of which is hereby incorporated by reference.

BACKGROUND OF THE INVENTION

1. Field of the Invention

The present invention relates to a method for data encryption and a method for conjunctive keyword search of encrypted data, and in particular, to a method for data encryption and a method for conjunctive keyword search of encrypted data to prevent data of a user from being leaked from an external server when important data of a user are stored in the external server.

2. Description of the Related Art

Recently, in respects to a leakage case of customer information from an enterprising database, a security problem with information stored in an external storage space has been an issue. Access control or key management techniques that have been mainly used for protecting information in a database, etc., is an effective method for stopping external hackers but does not basically prevent an owner of an external storage space from reading, leaking, and maliciously using the stored data. In order to safely store information, a method for encrypting and storing data is first considered. However, a general method used for data search is impossible to search the encrypted data, a search method considering this situation is needed.

The encrypted data search, which is a technology of searching desired data without decrypting the encrypted data, was first attempted by Song, et al. (IEEE Security and Privacy Symposium 2000). Most of methods mainly perform a search for one keyword.

In addition to the basic search, when considering conjunctive keyword search for several keywords, the easiest method to produce search results is to perform one keyword search several times. However, it is important not to expose the information on each keyword while performing the conjunctive keyword search for several keywords in respects to the privacy issue of the conjunctive keyword search.

For example, when searching a (A∩B) document including both of A and B, the user does not expose either information of other encrypted data including only A in addition to encrypted data from the search results nor the fact that the document is searched by a keyword to be 'A'. This is also similarly applied to 'B' herein. In this case, an applicable method is to store the conjunction results for all the keywords as indexes for the document. However, the method should store ${}_mC_1 + {}_mC_2 + \ldots + {}_mC_r$ indexes when the number of keywords for each data is m and the conjunction for keywords of r or less is stored. In worst case, if r=m, since approximately $2^m$ indexes should be stored, there is a problem in that the storage space is exponentially increased.

To solve the above problem, the conjunctive keyword method was proposed by Golle, et al. (ACNS 2004), while several studies have been progressed. Most of the conjunctive keyword search has mainly used a method based on pairing operation (it has been known that one-time pairing operation is similar to a speed of performing exponentiation operation about 6 to 20 times) but require a lot of operations, as a result, the method has a problem in view of efficiency and a limitation in a practical use.

SUMMARY OF THE INVENTION

It is an object of the present invention to provide a method for data encryption and a method for conjunctive keyword search of encrypted data capable of safely and rapidly searching data of a user stored in a server for storing external data.

Further, it is another object of the present invention to provide a method for data encryption and a method for conjunctive keyword search of encrypted data capable of performing encryption data search for one particular keyword as well as a conjunctive keyword search for a plurality of keywords.

Moreover, it is still another object of the present invention to provide a method for efficient data encryption and a method for conjunctive keyword search of encrypted data by encrypting search keywords upon searching data to enhance privacy of data for a user and shortening an operation time.

In order to achieve the above objects, there is provided a method for data encryption according to the present invention including: generating a secret key for data encryption and a secret key for index generation of encrypted data; encrypting data to be stored in a server for data storage using the secret key for data encryption; including a plurality of keyword fields, extracting the plurality of keywords from the data, and inputting them to the corresponding attribute keyword fields, respectively; and encrypting each of the extracted keywords by the secret key for index generation and generating indexes for the encrypted data using a plurality of keyword field addresses and the encrypted keywords.

The encrypting the data encrypts the data using a symmetric key encryption algorithm.

The generating the secret key includes calculating p, q, and n that satisfy $n = p \cdot q$, $p = 2p'+1$, and $q = 2q'+1$ (p' and q' are prime number). The generating the indexes generates indexes using the n values calculated in the calculating the p, q, and n for each keyword. Further, the generating the indexes generates indexes from the value calculated by selected values from 0 to n−1 raised to the exponent of the values of hashing the keywords corresponding to each keyword field using the secret key for index generation.

Meanwhile, the generating the indexes includes calculating index identifiers by hashing the selected values from 0 to n−1, wherein the index identifiers are included in the indexes.

The keyword fields have different attribute values of each keyword field and the keywords are input to the keyword fields having the attribute values corresponding to the keywords.

Moreover, the method for data encryption according to the present invention further includes transmitting the encrypted data and the indexes for the encrypted data to the server for data storage.

In order to achieve the above object, a method for conjunctive keyword search of encrypted data is a method for conjunctive keyword search of encrypted data stored in a server for data storage in a user terminal. The method for conjunctive keyword search of encrypted data includes selecting search keywords for encrypted data search; confirming keyword field addresses corresponding to the selected search keywords among the keyword fields of the encrypted data; generating trapdoors for the search keywords using the secret key for index generation used to generate the indexes for the encrypted data; and transmitting the generated trapdoors and the keyword field addresses confirmed in the confirming the keyword field addresses to the server for data storage.

The selecting the search keywords selects a plurality of keywords.

The generating the trapdoors generates the trapdoors by combining the plurality of keywords. Further, the generating the trapdoors generates the trapdoors by calculating an inverse element of the secret value $\phi(n)$ that satisfies $\phi(n)=(p-1)\cdot(q-1)$ from the secret values p and q used for generating the indexes for the encrypted data. Moreover, the generating the trapdoors generates the trapdoors by summing the values hashing one or more search keyword using the secret key for index generation.

In order to achieve the above object, a method for conjunctive keyword search of encrypted data according to the present invention is a method for conjunctive keyword search of encrypted data in a server for data storage. The method for conjunctive keyword search of encrypted data includes receiving trapdoors for search keywords and keyword field addresses corresponding to the search keywords in question from a user terminal; extracting index values corresponding to the received keyword field addresses, with respect to the encrypted data stored in the server for data storage; confirming whether the corresponding data include the search keywords using the extracted index values and the trapdoors; and transmitting the corresponding data to the corresponding user terminal according to results confirmed in the confirming the keyword field addresses.

The trapdoors received from the user terminal are generated by combining the plurality of keywords.

The confirming includes calculating a product of the index values extracted from each keyword field corresponding to the received keyword field addresses raised to the exponent of the trapdoors and comparing the calculated value with index identifiers included in the indexes. At this time, the comparing determines whether based values calculated by the product of the index values corresponding to each keyword field of the corresponding encrypted data raised to the exponent of the trapdoors conform to the values of the index identifiers.

If the comparison result from the comparing is determined that the hash values conform to the values of the index identifiers, it is determined that the corresponding encrypted data are include the search keywords.

Meanwhile, the method for conjunctive keyword search of encrypted data further includes prior to the receiving, receiving the encrypted data and the indexes for encrypted data from the user terminal and storing the received encrypted data and the indexes for encrypted data.

With the present invention, the method for desired data search without decrypting the encrypted data allows the server to provide the user's desired data without the server knowing the contents or keywords of data, such that the privacy of the user's important data can be secured. Further, the privacy of the user data is enhanced by making it difficult for the server to know the information on each keyword, except for the encrypted data obtained through the conjunctive keyword search for the plurality of keywords.

Moreover, the degradation in efficiency due to the excess operation involved in the method based on the existing pairing operation by shortening the operation time upon searching the encrypted data can be prevented.

BRIEF DESCRIPTION OF THE DRAWINGS

FIGS. 6A to 6C are exemplary diagrams referenced for explaining a configuration of keyword fields according to the present invention; and FIG. 7 is an exemplary diagram showing an embodiment of the encrypted data according to the present invention and indexes for the encrypted data according to the present invention.

DETAILED DESCRIPTION OF THE PREFERRED EMBODIMENTS

Hereinafter, exemplary embodiments of the present invention will be described with reference to the accompanying drawings.

Figure 1:
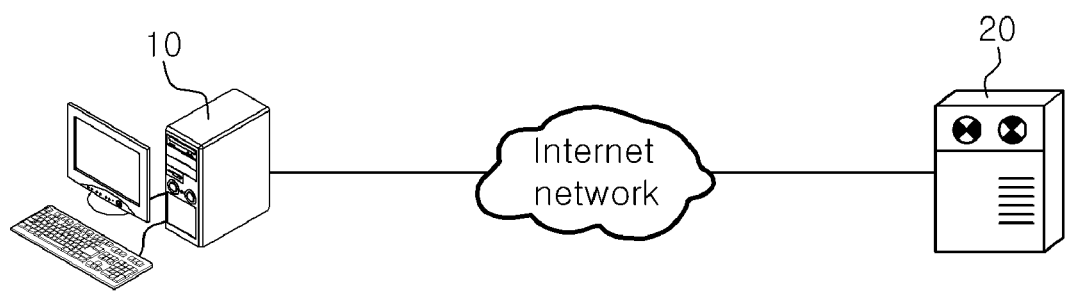
FIG. 1 shows a system configuration for implementing a method for data encryption and a method for conjunctive keyword search of encrypted data according to the present invention.

FIG. 1 shows a system configuration for implementing a method for data encryption and a method for conjunctive keyword search of encrypted data according to the present invention.

As shown in FIG. 1, the method for data encryption and the method for conjunctive keyword search of encrypted data according to the present invention are performed between a user terminal and a server 20 for data storage.

A user terminal 10 encrypts the corresponding data and transmits them to the server 20 for data storage so as to store data in the server 20 for data storage. Further, the user terminal 10 extracts one or more keyword from the corresponding data and generates indexes using the extracted keywords. In addition, the user terminal 10 calculates index identifiers for keyword search and includes them in the indexes, when generating the indexes. At this time, the user terminal 10 transmits the encrypted data together with the indexes when transmitting the encrypted data to the server 20 for data storage.

Thereafter, the indexes stored in the server 20 for data storage are used when searching the encrypted data from the user. Moreover, the index identifiers included in the indexes are used as values for comparison keys that confirm whether the indexes for each data include the search keywords during the index search for the encrypted data using the search keywords.

Meanwhile, the user terminal 10 generates a secret key $(K_1)$ for data encryption and a secret key $(K_2)$ for index generation prior to encrypting the data. Herein, the secret key $(K_1)$ for data encryption and the secret key $(K_2)$ for index generation are randomly generated to have different values and are private keys that are known to only by a user. The user terminal 10 encrypts the data using the secret key $(K_1)$ for data encryption and encrypts the keywords using the secret key $(K_2)$ for index generation, thereby generating the indexes.

Therefore, although the encrypted data and indexes are stored in the server 20 for data storage, the server 20 for data storage does not know the secret key $(K_1)$ for data encryption and the secret key $(K_2)$ for index generation, such that it does not know the contents of the stored data and the information on the keywords included in the index.

The user terminal 10 stores the keyword field information of data that are stored in the server 20 for data. Herein, the keyword field information is field addresses and field attribute information.

Meanwhile, the user terminal 10 generates trapdoors (x) using one or more search keyword for data search when searching the data stored in the server 20 for data storage. The user terminal 10 transmits the trapdoors (x) and the keyword field information corresponding to the search keywords to the server 20 for data storage. Herein, the keyword field information is address information on the keyword fields corresponding to the attributes of the input search keywords. The user terminal 10 encrypts the search keywords using the secret key ($K_2$) for index generation to generate the trapdoors (x). Similarly, the server 20 for data storage does not know the secret key ($K_2$) for index generation, such that it does not know the search keyword information included in the trapdoors (x).

The server 20 for data storage stores the data encrypted by the user terminal 10 and the indexes for the encrypted data. When receiving the trapdoors (x) and the address information for the corresponding keyword fields from the user, the server 20 for data storage searches the stored indexes using the received trapdoors (x) and the corresponding keyword field addresses.

At this time, the server 20 for data storage extracts the index values corresponding to the keyword field addresses using the keyword field addresses received from the user terminal 10. Further, the server 20 for data storage extracts the index identifiers included in the indexes for the corresponding data. The server 20 for data storage calculates hash values with regards to values that apply the trapdoors (x) received from the user terminal 10 to the extracted index values and compares the calculated hash values with the index identifiers.

If the indexes having the index identifiers conforming to the calculated hash values are detected, the server 20 for data storage determines that the search keywords included in the trapdoors (x) conform to the keywords in the corresponding indexes. Therefore, the server 20 for data storage extracts the corresponding data and transmits them to the user terminal 10. Therefore, the server 20 for data storage can provide the corresponding data to the search keywords input from the user without the server 20 knowing the contents of data and indexes.

Thereafter, the user terminal 10 decrypts the data received from the server 20 for data storage using an initially generated secret key ($K_1$) for data encryption and then outputs them.

The method for data encryption and the method for conjunctive keyword search of encrypted data between the user terminal and the server for data storage will be described in detail with reference to FIGS. 2 to 4.

Figure 2:
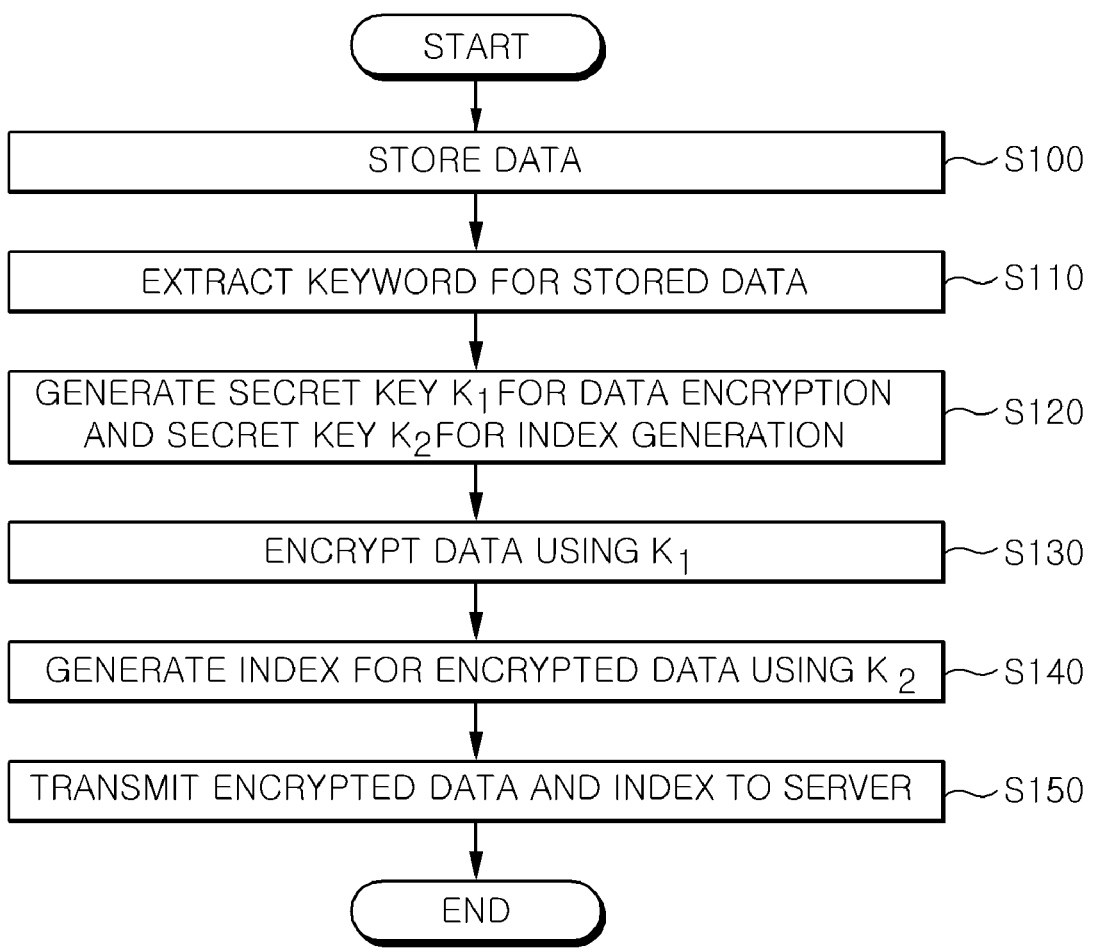
FIG. 2 is a flowchart showing an operation flow of the method for data encryption according to the present invention.

First, FIG. 2 is a flow chart showing an operation flow of the method for data encryption according to the present invention and shows the operation flow that encrypts data in the user terminal and stores them in the server for data storage.

Referring to FIG. 2, the user terminal 10 stores predetermined data (S100). At this time, the user terminal 10 includes the keyword fields that can store the plurality of keywords for each data. The user terminal 10 extracts the plurality of keywords from the corresponding data (S110). Each of the extracted keywords corresponds to each of the keyword fields having the corresponding field attribute. At this time, the user interrupts the input of the same keywords to other keyword fields.

Meanwhile, the user terminal 10 encrypts data so as to store the stored data in the server 20 for data storage. At this time, the secret key ($K_1$) for data encryption to encrypt data and a secret key ($K_2$) for index generation to generate the indexes for data are generated (S120). Therefore, the user terminal 10 encrypts the stored data using the secret key ($K_1$) for data encryption (S130). In addition, the user terminal 10 generates the indexes for the encrypted data using the secret key ($K_2$) for index generation (S140).

The user terminal 10 transmits the encrypted data and indexes to the server 20 for data storage and stores the corresponding data in the server 20 for data storage (S150). Thereafter, the data stored in the user terminal 10 is erased. In other words, the user terminal 10 stores only the keyword fields for keyword search of data stored in the server 20 for data storage.

In this process, since the user terminal 10 transmits data to the server 20 for data storage in the encrypted state, the server 20 for data storage does not know the secret key, such that it cannot confirm the contents of the corresponding data. Of course, other users accessing the server 20 for data storage does not know the secret key, such that they cannot confirm the contents of data. Therefore, even when personal data are stored in the server 20 for data storage having a low security level, the leakage of the contents of the corresponding data to the outside can be prevented.

Further, the user terminal 10 encrypts each keyword for the corresponding data using the secret key when generating the indexes for data search, such that it can prevent the contents of indexes from being leaked to the server 20 for data storage that stores the corresponding indexes or other users.

Figure 3:
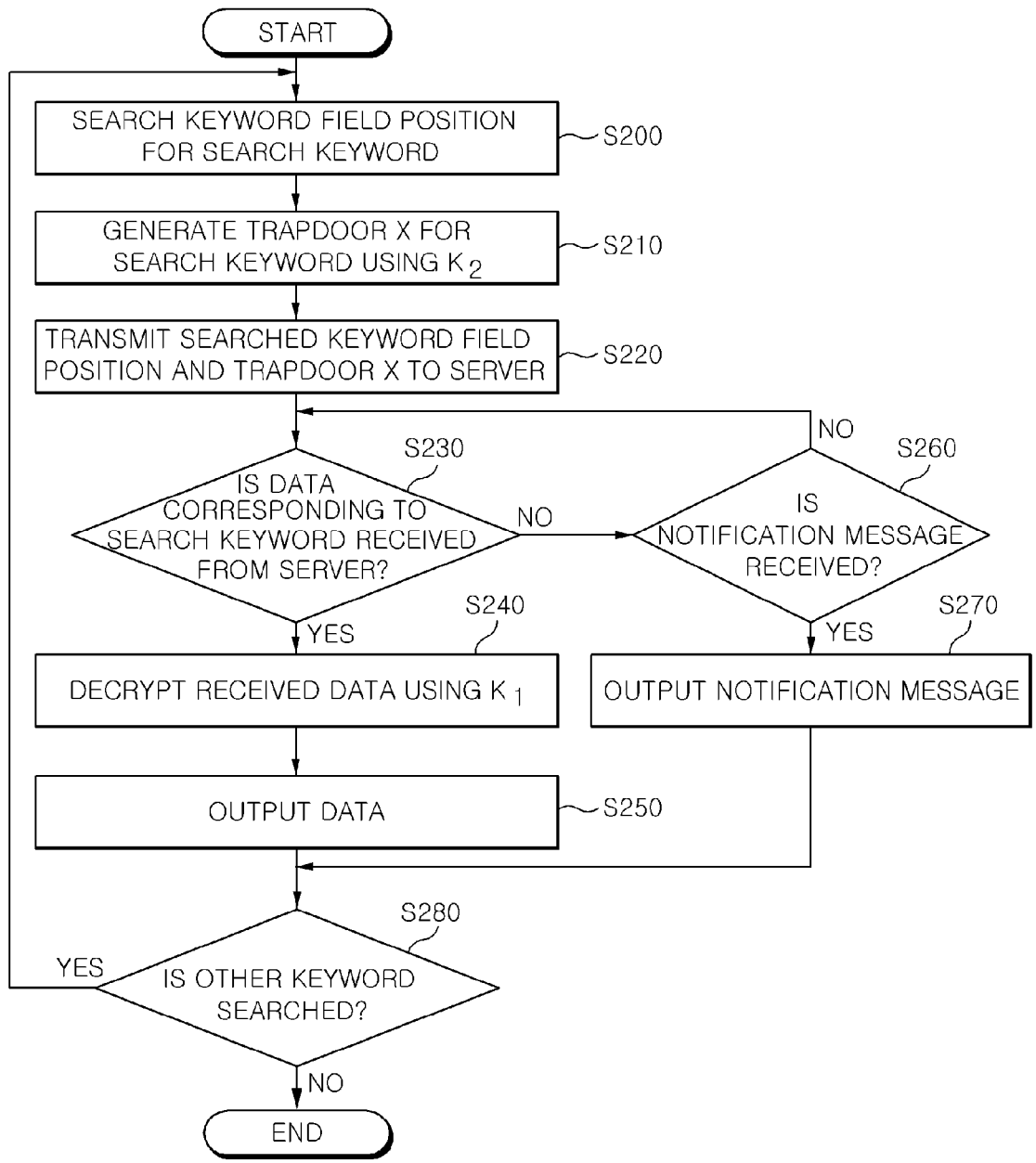
FIGS. 3 and 4 are flowcharts showing an operation flow of the method for conjunctive keyword search of encrypted data according to the present invention.

FIG. 3 is the method for conjunctive keyword search of encrypted data according to the present invention and shows an operation flow of searching the data stored in the server for data storage in the user terminal.

Referring to FIG. 3, the user terminal 10 searches the keyword field addresses corresponding to the attribute of the input search keywords, when one or more search keyword is input (S200). For example, when the search keyword corresponding to <name> attribute such as 'Hong Gil Dong' is input, the user terminal 10 searches the keyword field addresses corresponding to the name attributes of each data. Of course, when the search keywords are two or more, all the keyword field addresses corresponding to each search keyword are searched.

In addition, the user terminal 10 generates the trapdoors (x) for one or more input search keyword using the secret key ($K_2$) for index generation generated in the 'S120' process of FIG. 2 (S210). At this time, the user terminal 10 transmits the keyword field addresses searched in the 'S200' process and the trapdoors (x) generated in the 'S210' process to the server 20 for data storage, such that it requests data including the search keywords (S220).

If the user terminal 10 receives data corresponding to the search keyword from the server 20 for data storage (S230), it decrypts the received data using the secret key ($K_1$) for data encryption generated in the 'S120' process of FIG. 2 (S240). In other words, since the data received from the server 20 for data storage are encrypted by the user terminal 10, they are decrypted into a readable state by the secret key ($K_1$) used for encrypting the corresponding data. Therefore, the user terminal 10 decrypts the corresponding data and then outputs the decrypted data (S250).

Meanwhile, if the user terminal 10 receives notification messages notifying the search failure from the server 20 for data storage (S260), it outputs the messages notifying the received search failure (S270). Thereafter, the user terminal 10 can request again the search of the corresponding data to the server 20 for the corresponding data storage. Moreover, when requesting the search of the corresponding data to the server 20 for data storage using other search keywords (S280), the user terminal 10 repetitively performs the 'S200 to S270' processes.

Figure 4:
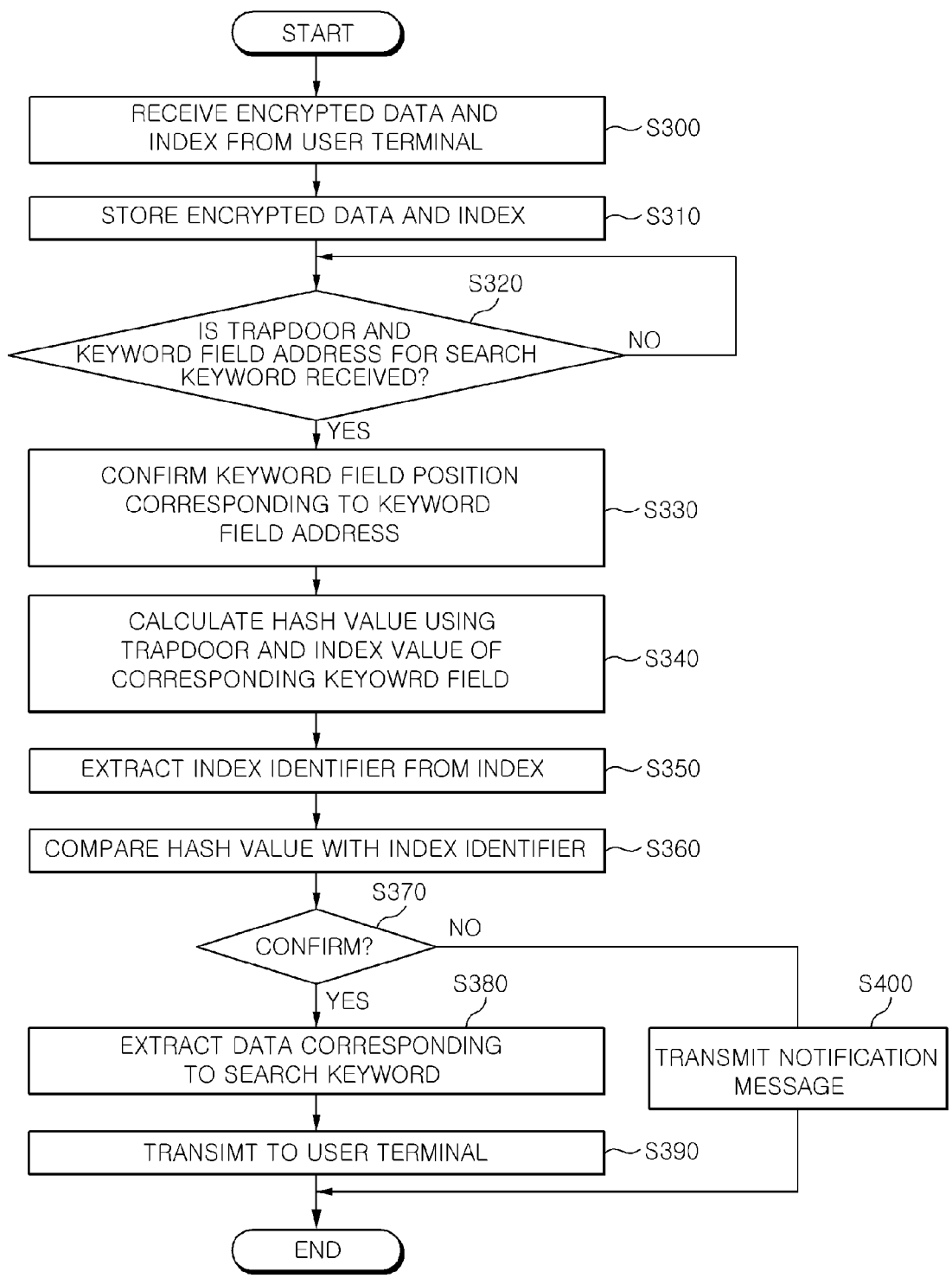

FIG. 4 is a flowchart showing an operation flow of the method for conjunctive keyword search of encrypted data according to the present invention and shows an operation flow of searching the encrypted data in the server for data storage.

Referring to FIG. 4, the server 20 for data storage stores the received data and the indexes corresponding thereto (S310) when receiving the encrypted data and the indexes corresponding thereto from the user terminal 10 (S300).

Thereafter, when receiving the trapdoors (x) for one or more search keyword and the keyword field addresses from the user terminal 10, the server 20 for data storage searches the data including the corresponding search keywords. At this time, since the server 20 for data storage does not know the secret key for the encrypted data and trapdoors (x), it performs the search of the corresponding data without the server knowing the contents of data and the search keywords included in the trapdoors (x).

In other words, the server 20 for data storage confirms the corresponding keyword field positions from the stored indexes using the addresses for the keyword field received from the user terminal 10. If the corresponding field position is confirmed, the server 20 for data storage calculates the hash values using the index values of the corresponding keyword fields and the trapdoors (S340). Meanwhile, the server 20 for data storage extracts the index identifiers from the indexes for the corresponding data (S350). At this time, the server 20 for data storage compares the hash values calculated in the 'S340' process with the index identifiers extracted in the 'S350' process (S360).

Herein, the process of calculating the index values and the hash values from the trap door (x) and the process of comparing the index identifiers will be described in detail with reference to Equation 4. At this time, when the corresponding indexes include the search keywords of the trapdoors (x), two values conform to each other.

Therefore, when the comparison results in the 'S360' process conforms to each other, the server 20 for data storage extracts data corresponding to the index values (S380) and transmits the extracted data to the user terminal 10 (S390). On the other hand, when the comparison results in the 'S360' process do not conform to each other, the server 20 for data storage generates the notification messages that notify the search failure and transmits them to the user terminal (S400).

Figure 5:
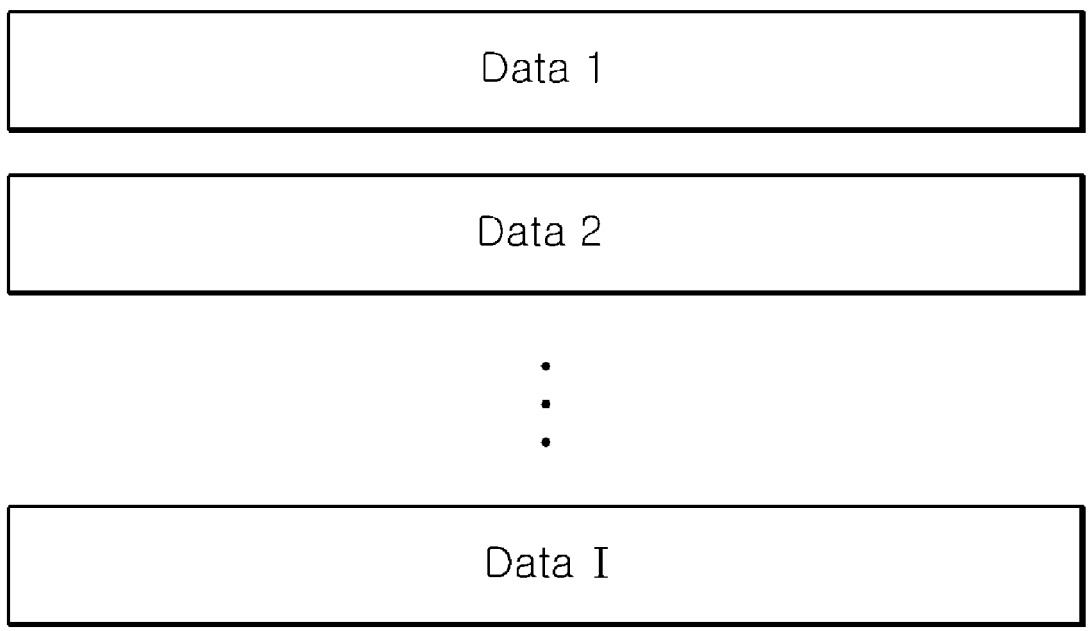
FIG. 5 is an exemplary diagram showing a data configuration applied to the present invention.

FIGS. 5 to 7 are exemplary diagrams referenced for describing the method for data encryption according to the present invention.

First, FIGS. 5 and 6 are exemplary diagrams showing a data structure stored in the user terminal. The user terminal 10 stores a total of I data such as Data1, Data2, ..., DataI as shown in FIG. 5. At this time, the user terminal 10 stores data together with the keywords for data when storing the data. The keyword includes a plurality of keyword field for each data and the corresponding keywords are stored in each keyword field. At this time, each keyword field has different attributes and the keywords corresponding to the attributes in question are stored in the keyword fields. Herein, the same keywords cannot be stored in each keyword field.

Figure 6A:
Figure 6B:
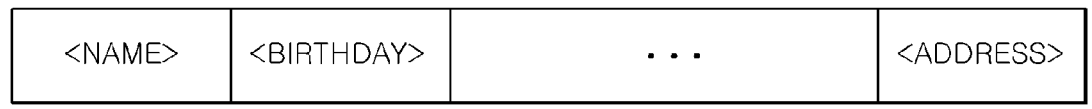

Referring to FIGS. 6A to 6C, there are a plurality of keyword fields for one data. In other words, a total of J keyword fields are defined as keyword field 1, keyword field 2, ..., keyword field J. At this time, the keyword field 1 has "name" attribute and the keyword field 2 has "birthday" attribute. Further, the keyword field J has "address" attribute. At this time, assume that the proposed method cannot indicate the same keywords in different keyword fields so as to secure safety. As can be appreciated from an example of FIGS. 6A to 6C, when the keywords of the corresponding data is "name: Hong Gil Dong" and "birthday: 1960 Jan. 1", the "name: Hong Gil Dong" is stored in the keyword field 1 having the name attribute and the "birthday: 1960 Jan. 1" is stored in the keyword field 2 having the birthday attribute. Meanwhile, there is no keyword corresponding to the address attribute, such that the keyword field J having the address attribute becomes a "address: Null" state. In this case, the same keywords are not indicated in two different keyword fields.

FIGS. 6A to 6C show a keyword field structure for one data and Data1, Data2, ..., DataI, respectively, shown in FIG. 5 having the keyword field structure of FIGS. 6A to 6C.

Meanwhile, when the user terminal 10 encrypts data having the structure of FIGS. 5 and 6, it uses the following function of Equation 1.

$$E_{K_1}(D_i) \cdot h_{K_2}(W_{ij}) = h_{ij}$$  [Equation 1]

$D_i$: $i^{th}$ data, $W_{ij}$: keyword corresponding to $j^{th}$ keyword field of $D_i$ $E_{K_1}(\ )$: symmetric key encryption algorithm where key is $K_1$
$h_{12}(\ )$: keyed hash function where key is $K_2$ Herein, $E_{K_1}(D_i)$ is a symmetric key encryption algorithm using a secret key $K_1$ for data encryption and encrypts $i^{th}$ ($1 \leq i \leq I$, i is an integer) data of Data1, Data2, ..., DataI. Of course, the user terminal 10 applies the symmetric key encryption algorithm to Data1, Data2, ..., DataI, respectively, to generate $E_{K_1}(D_1), E_{K_1}(D_2), ..., E_{K_1}(D_I)$.

Meanwhile, $h_{K_2}(W_{ij})$ is a hash function for generating the indexes for encrypted data using the secret key $K_2$ for index generation and encrypts the keyword ($W_{ij}$) corresponding to the $j^{th}$ ($1 \leq j \leq J$, j is an integer) keyword field of the keyword fields for $i^{th}$ data to generate the indexes. Where, h is a general keyed hash function and is a published function. Further, the keyword $h_{K_2}(W_{ij})$ will be described as $h_{ij}$ for convenience of explanation.

At this time, the user terminal 10 applies the hash function to each keyword stored in the keyword fields. In other words, the user terminal 10 calculates $h_{K_2}(W_{i1}), h_{K_2}(W_{i2}), ..., h_{K_2}(W_{iJ})$, respectively, for all the data up to Data1, Data2, ..., DataI. Moreover, the user terminal 10 generates the indexes using $h_{K_1}(W_{i1}), h_{K_2}(W_{i2}), ..., h_{K_2}(W_{iJ})$. Equation 2 indicates I(i) when it is assumed that the index for Data i, which is $i^{th}$ data, is I(i).

$$I(i) = \{h(a_i), a_i^{h_{i1}} \bmod n, a_i^{h_{i2}} \bmod n, ..., a_i^{ij} \bmod n\}, a_i \in \{0, n-1\}, n = p \cdot q, p = 2p'+1, q = 2q'+1 \ (p', q':$$
prime number)  [Equation 2]

The user terminal 10 calculates $h(a_i)$, which is the index identifier, used for the keyword search of the corresponding data. Here $h(\ )$ is a general hash function. Therefore, the index for Data i includes the index identifier $h(a_i)$ and index values $(a_i)^{h_{i1}} \bmod n, (a_i)^{h_{i2}} \bmod n, ..., (a_i)^{h_{iJ}} \bmod n$ that correspond to each keyword field.

Herein, $a_i$ is any constant and is randomly selected from numbers from 0 to n−1. Also, n is a value calculated by a product of p and q that are any numbers. At this time, p and q are numbers that satisfy p=2p'+1 and q=2q'+1 (p' and q' are prime number). Herein, n is a published value to the outside and is determined to be a number having a size of 1024 bits or more based on the safety of RSA. On the other hand, p and q are secret values.

As described above, the encrypted data and the indexes corresponding thereto are shown in FIG. 7. In FIG. 7, (A) indicates a list of each encrypted data and (B) indicates the indexes corresponding to the encrypted data. In the indexes of (B), $h(a_1), h(a_2), ..., h(a_I)$ indicates the index identifiers of each data. At this time, the index may be implemented in a form included in the corresponding encrypted data but may be implemented in a separate index field form.

Therefore, the server 20 for data storage stores the encrypted data (A) received from the user terminal 10 and the index (B) corresponding thereto in DB.

Next, a detailed embodiment of the method of generating the trapdoors (x) from the user terminal 10 of FIG. 2 will be described.

First, assume that the search keywords for data to be searched in the server 20 for data storage are $W_{j1}, W_{j2}, \ldots, W_{jt}$. In other words, the number of search keywords is t. At this time, one search keyword corresponding to each attribute of each keyword field is input and the number of search keywords does not excess the total number of keyword fields.

The user terminal 10 senses the attributes of each search keywords and extracts the keyword field addresses corresponding to the sensed attributes. The keyword field addresses corresponding to each search keywords are $j_1, j_2, \ldots, j_t$. Herein, the trapdoors x for the search keywords $W_{j1}, W_{j2}, \ldots, W_{jt}$ will be calculated with reference to the following Equation 3.

$$H = h_{K_2}(W_{j1}) + h_{K_2}(W_{j2}) + \ldots + h_{K_2}(W_{jt}).$$

$$xH \equiv 1 \bmod \phi(n)$$

$$\phi(n) = (p-1)(q-1) \quad \text{[Equation 3]}$$

In other words, the user terminal 10 uses $K_2$, which is the secret key for index generation, to calculate $h_{K_2}(W_{j1})$, $h_{K_2}(W_{j2}) \ldots, h_{K_2}(W_{jt})$ that are the hash values of $W_{j1}, W_{j2}, \ldots, W_{jt}$ and calculate H that is a sum of the hash values of each search keyword. Further, the user terminal 10 calculates $\phi(n)$ using the secret values p and q used at the time of generating the initial index.

At this time, the user terminal 10 applies H and $\phi(n)$ to $xH \equiv 1 \bmod \phi(n)$ to generate the trapdoors (x). Herein, since p and q are private values that are known only to the user, the trapdoor (x) for the search keywords $W_{j1}, W_{j2}, \ldots, W_{jt}$ can be generated only by the user. Therefore, the user terminal 10 transmits the keyword field addresses $(j_1, j_2, \ldots, j_t)$ corresponding to the generated trapdoors (x) and the attributes of the search keyword to the server 20 for data storage to request the data including the search keyword.

Meanwhile, the server 20 for data storage performs the search for the encrypted data using the trapdoors(x) and the keyword field addresses $(j_1, j_2, \ldots, j_t)$ that are received from the user terminal 10. At this time, the server 20 for data storage first searches the indexes in order to search the data including the search keywords among the stored data $E_{K1}(D_1), E_{K1}(D_2), \ldots E_{K1}(D_I)$. At this time, the server 20 for data storage extracts the index values corresponding to the received keyword field addresses $(j_1, j_2, \ldots, j_t)$. In other words, the server 20 for data storage does not perform the keyword field search for all of the stored index values but performs the keyword field search by extracting only the index values of the keyword fields corresponding to the attributes of the search keywords. Therefore, the operation is reduced according to the keyword field search, making it possible to more rapidly perform the search work.

In other words, the server 20 for data storage calculates $R_1$ and $R_2$ of Equation 4 using the received keyword field addresses $(j_1, j_2, \ldots, j_t)$.

$$R_1 \equiv a_i^{h_{ij_1}} \cdot a_i^{h_{ij_2}} \cdot \ldots \cdot a_i^{h_{ij_t}} \equiv a_i^{h_{ij_1}+h_{ij_2}+\ldots+h_{ij_t}} \bmod n \quad \text{[Equation 4]}$$

$$R_2 \equiv R_1^x \bmod n$$

In other words, the server 20 for data storage extracts the index values corresponding to the received keyword field addresses $(j_1, j_2, j_t)$ and calculates $R_1$ by multiplying each index value extracted. Further, $R_2$ is calculated using $R_1$ and the trapdoor (x) value. At this time, $R_2 \equiv (R_1)^x \bmod n$.

Meanwhile, the server 20 for data storage extracts the index identifiers included in the indexes for the corresponding data. At this time, the extracted identifiers are comparison key values for keyword search and the server 20 for data storage compares the index identifiers with the values hashing $R_2$ of Equation 4. For example, the server 20 for data storage extracts the index values for the keyword fields corresponding to the search keywords from the indexes for Data i and if the calculated value is $h(R_2)$, compares $h(a_i)$ and $h(R_2)$, which are the index identifiers of the corresponding data.

At this time, if the keywords conform to each other, since $h_{i,j_1} + h_{i,j_2} + \ldots + h_{i,j_t} = H$ then $R_1 \equiv a_i^H \bmod n$. Herein, since $x \equiv 1/H \bmod \phi(n)$ from $xH \equiv 1 \bmod \phi(n)$ of Equation 3, then $R_2 = (a_i^H)^{1/H} \equiv a_i \bmod n$. In other words, when the search keyword conforms to the keyword for the index, it is established that $h(R_2) = h(a_i)$. Therefore, the server 20 for data storage extracts the data $E_{K1}(D_i)$ for which the keyword conforms and transmits the extracted $E_{K1}(D_i)$ to the corresponding user terminal 10.

On the other hand, when $h(R_2) \neq h(a_i)$ from the result value calculated by Equation 4, the server 20 for data storage determines that the search keyword does not conform to the keyword for the index and generates the notification messages that notify the search failure using the corresponding search keyword and transmits them to the corresponding user terminal 10.

The present invention does not perform the pairing operation several times, which has been mainly used in the previous existing methods and uses the number of exponentiation operations similar to the number of the exponentiation operations used in the previous ones and additionally, the present invention uses only simple algebra operation and hash function operation, thereby increasing the efficiency as compared to the existing method.

As described above, the method for data encryption and the method for conjunctive keyword search of encrypted data according to the present invention are not limited to the configuration and method of the embodiments described as above, but the embodiments may be configured by selectively combining all the embodiments or some of the embodiments so that various modifications can be made.

What is claimed is:

1. A method for data encryption and conjunctive keyword search of encrypted data, the method comprising:

generating a secret key for data encryption and a secret key for index generation of encrypted data;

encrypting data to be stored in a server for data storage using the secret keys for data encryption;

including a plurality of keyword fields and extracting the plurality of keywords from the data, and storing them in the plurality of keyword fields, respectively;

generating indexes for the encrypted data using address information on the keyword fields in which the keywords extracted from the data are stored and the secreted key for index generation;

selecting search keywords for encrypted data search;

confirming keyword field addresses stored with the selected search keywords among the keyword fields in which each keyword for the encrypted data is stored;

generating trapdoors for the search keywords using the secret key for index generation used to generate the indexes for the encrypted data; and transmitting the generated trapdoors and the keyword field addresses confirmed in the confirming the keyword field addresses to the server for data storage, wherein the indexes include index identifiers which are used as values for comparison keys to confirm whether the indexes include index values corresponding to the search keywords, wherein the generating the trapdoors generates the trapdoors by calculating an inverse element of the secret value $\phi(n)$ that satisfies $\phi(n)=(p-1)\cdot(q-1)$ from the secret values p and q used for generating the indexes for the encrypted data, wherein the generating the trapdoors generates the trapdoors by summing the values hashing the plurality of search keywords using the secret key for index generation.

2. The method for data encryption according to claim 1, wherein the generating the secret key includes calculating p, q, and n that satisfy $n=p\cdot q$, $p=2p'+1$, and $q=2q'+1$ (p' and q' are prime number).

3. The method for data encryption according to claim 2, wherein the generating the indexes generate the indexes using the n values.

4. The method for data encryption according to claim 2, wherein the generating the indexes generates indexes from the value calculated by selected values from 0 to n−1 raised to the exponent of the values of hashing the keywords corresponding to each keyword field using the secret key for index generation.

5. The method for data encryption according to claim 1, wherein the keyword fields have different attribute values of each keyword field and the keywords are stored in the keyword fields having the attribute values corresponding to the keywords.

6. The method for data encryption according to claim 1, further comprising transmitting the encrypted data and the indexes for the encrypted data to the server for data storage.

7. A method for conjunctive keyword search of encrypted data stored in a server for data storage in a user terminal, comprising:

selecting search keywords for encrypted data search;

confirming keyword field addresses stored with the selected search keywords among the keyword fields in which each keyword for the encrypted data is stored;

generating trapdoors for the search keywords using the secret key for index generation used to generate the indexes for the encrypted data; and transmitting the generated trapdoors and the keyword field addresses confirmed in the confirming the keyword field addresses to the server for data storage, wherein the indexes include index identifiers which are used as values for comparison keys to confirm whether the indexes include index values corresponding to the search keywords, wherein the generating the trapdoors generates the trapdoors by calculating an inverse element of the secret value $\phi(n)$ that satisfies $\phi(n)=(p-1)\cdot(q-1)$ from the secret values p and q used for generating the indexes for the encrypted data, wherein the generating the trapdoors generates the trapdoors by summing the values hashing the plurality of search keywords using the secret key for index generation.

8. The method for conjunctive keyword search of encrypted data according to claim 7, wherein the generating the trapdoors generates the trapdoors by combining the plurality of keywords.

9. A method for conjunctive keyword search of encrypted data in a server for data storage, comprising:

receiving the trapdoors for search keywords and keyword field addresses corresponding to the search keywords in question from a user terminal;

extracting index values corresponding to the received keyword field addresses, with respect to the encrypted data stored in the server for data storage;

confirming whether the corresponding data include the search keywords using the extracted index values and the trapdoors; and transmitting the corresponding data to the corresponding user terminal according to results confirmed in the confirming the keyword field addresses, wherein the confirming includes calculating a product of the index values extracted from each keyword field corresponding to the received keyword field addresses raised to the exponent of the trapdoors and comparing the calculated value with the extracted index values, wherein the comparing determines whether hashed values of values calculated by the product of the index values corresponding to each keyword field of the corresponding encrypted data raised to the exponent of the trapdoors conform to the hashed values of extracted index values, wherein if the comparison result of the comparing is determined that the hash values conform to the values of the index identifiers, it is determined that the corresponding encrypted data are include the search keywords.

10. The method for conjunctive keyword search of encrypted data according to claim 9, wherein the trapdoors received from the user terminal are generated by combining the plurality of keywords.

11. The method for conjunctive keyword search of encrypted data according to claim 9, further comprising: prior to the receiving, receiving the encrypted data and the indexes for encrypted data from the user terminal; and storing the received encrypted data and the indexes for encrypted data.

* * * * *